July 6, 1943.  C. H. WANN  2,323,502

MOTOR VEHICLE WHEEL

Filed July 13, 1942  2 Sheets-Sheet 1

Inventor
Charles H. Wann,
By McMorrow and Berman
Attorneys

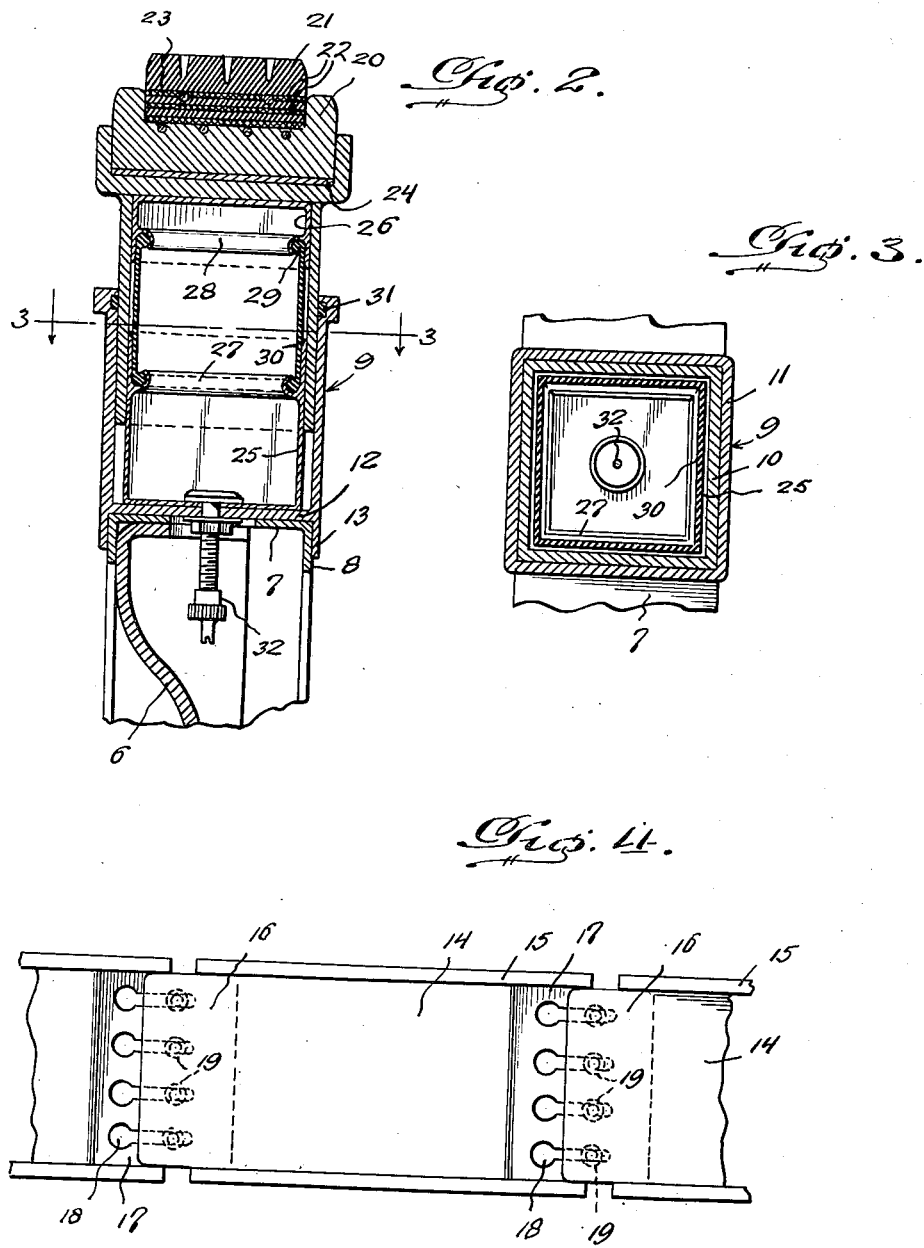

Patented July 6, 1943

2,323,502

UNITED STATES PATENT OFFICE 2,323,502

MOTOR VEHICLE WHEEL

Charles H. Wann, Arcadia, Ind., assignor of one-half to Merrill N. Wann, Winchester, Ind.

Application July 13, 1942, Serial No. 450,736

2 Claims. (Cl. 152—8)

This invention relates to a motor vehicle wheel, the primary object thereof being to provide a pneumatic cushioning construction for absorbing road shocks to eliminate the use of pneumatic tires on motor vehicles and permit the use of a road tread element or member on the wheel in which rubber will be reduced to a minimum or if desired some other noise deadening material may be employed in the construction of said road tread member, thereby conserving rubber to a maximum amount in the cushioning of motor vehicles to road shocks.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a motor vehicle wheel constructed in accordance with my invention.

Figure 2 is a sectional view taken on the line 2—2 of Figure 1.

Figure 3 is a sectional view taken on the line 3—3 of Figure 2.

Figure 4 is a fragmentary plan view illustrating the connection of channel plate employed for mounting the tread rim on the spokes of the wheel.

Figure 1:
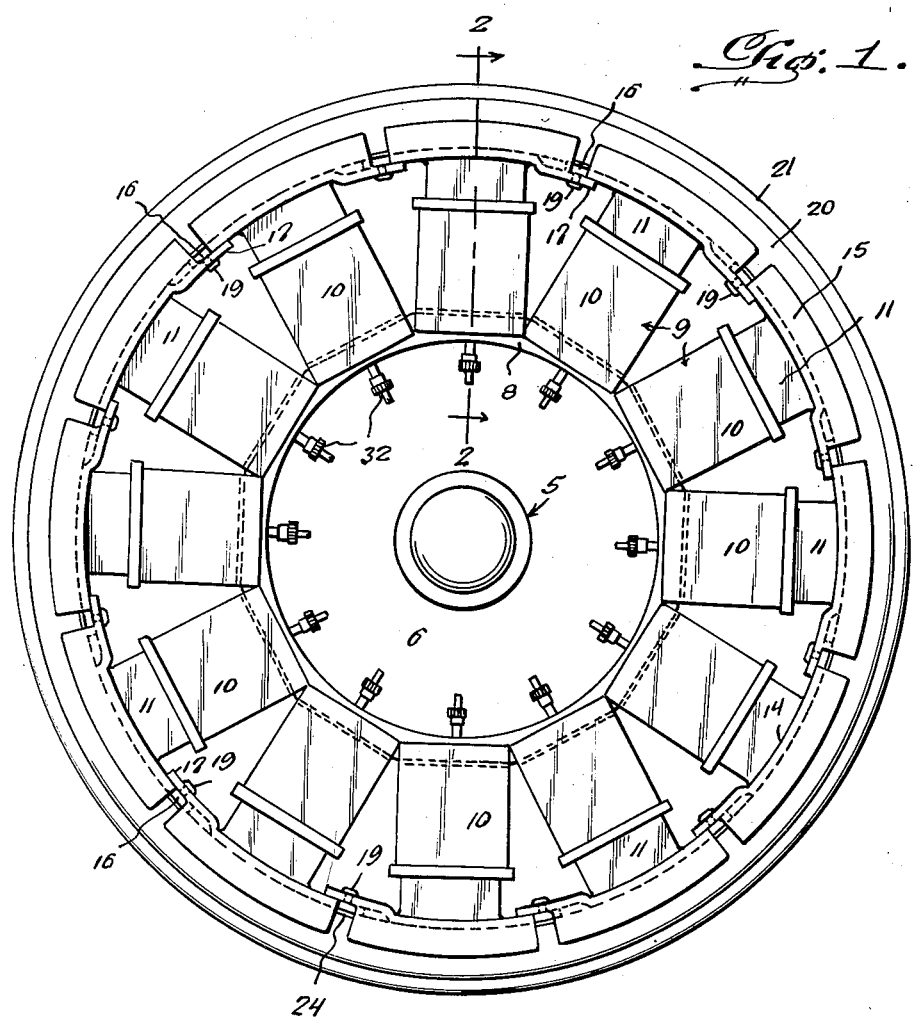
Figure 5:
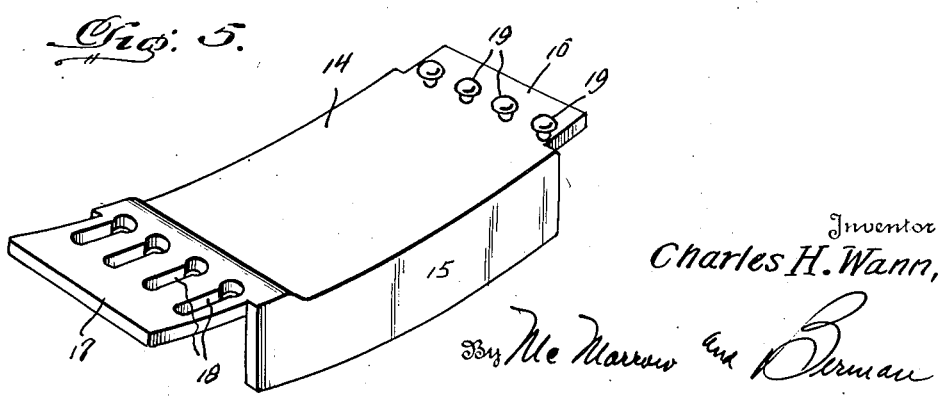
Figure 5 is a perspective view illustrating one of the plates.

Referring in detail to the drawings, the numeral 5 indicates diagrammatically a wheel hub of a conventional construction and 6 a disc-like portion which may be demountable or form a permanent part of the hub 5. Secured on the disc is an annular main rim 7 provided with annular flanges 8 at the edges thereof, said flanges extending in the direction of the hub. The diameter of the main rim 7 is much less than the diameter of a motor vehicle wheel of a conventional construction and has mounted thereon a plurality of radially arranged spokes 9 each of telescopic construction and each spoke consists of cylinder-like sections 10 and 11 each of substantially rectangular shape in cross section and having a slidable fit with each other.

The section 10 has an end wall 12 spaced a limited distance from one end of the section and said end of the section 10 is constructed to form opposite flanges 13 that overlap the flanges 8 of the main rim 7 and are secured thereto in any well known manner such as by welding, riveting or the like.

The section 11 of the spoke has formed integrally with one end thereof a plate 14, equipped with side flanges 15 shorter in length than the length of said plate 14 to provide at the ends of said plate extensions 16 and 17. The extension 17 is slightly offset from the plane of the plate 14 and is provided with a series of slots 18, each of substantially key-hole shape. The extension 16 has secured thereon headed studs 19. The studs 19 of one plate 14 are adapted to fit in the slots of the extension 17 of the adjacent plate 14. When all of the plates of the spokes are thus connected, a sectional channeled rim is provided for supporting thereon an annular tread carrying rim 20. The rim 20 is of the channeled type and has mounted thereon an annular continuous tread member 21 provided with a suitable non-skid surface and may be constructed of a synthetic rubber suitably reinforced by annularly formed metallic bands 22 and layers of fabric 23. If desired, the tread member 21 may be made of some other material which would have a sound deadening quality.

It is preferable that the tread rim 20 be reinforced by an annular metallic band 24. The rim 20 may be constructed of wood or any other material suitable for the purpose.

Mounted in the sections 7 and 11 of each spoke 9 are sleeves 25 and 26. Any suitable means may be provided for securing the sleeves to the sections of the spokes. The sleeves are provided with closed ends and fully open ends, with the open ends of the sleeves arranged opposed to each other. Formed in the sleeves are flanges 27 and 28. The flanges have curvatures thereto to form seats for the beaded ends 29 of an elastic sleeve 30 that extends from one sleeve into the other sleeve for the purpose of providing a leak-proof connection between the sleeves and the sections 10 and 11 of the spokes and still permits the sections 10 and 11 to slide relative to each other.

It is preferable that a suitable packing 31 be mounted in the section 10 to engage the section 11 of the spoke for the purpose of excluding foreign matter from the interior of the spoke construction.

A spoke construction of the kind described will form an air chamber and in order that this chamber may be inflated with air, an inflating valve 32 of a conventional construction is provided. The inflating valve is suitably mounted in the wall 12 of the section 10 of the spoke also through an opening in the end wall of the sleeve 25 and extends through a slot provided in the disc 6 of the wheel.

Thus it will be seen that the various air chambers can be inflated to a desired number of pounds of air pressure and this air pressure acts to drive the plates 14 outwardly in a radial direction, tightly securing the tread rim 20 on the plates. However, during the cushioning action of the spokes when subjected to road shock, a slight creeping of the tread rim relative to the plates 14 may occur. Also it will be seen that when the spokes are subjected to road shock or any one of the spokes receives road shock, the slidable connections between the plates 14 will permit a limited sliding movement of the section 11 relative to the section 10 of the spokes against the air pressure for the purpose of absorbing the road shock and also to permit any one of the plates 14 to move closer to the adjacent plates 14 thereto during the movement of the sections 11 relative to the sections 10 of the spokes.

A wheel of the construction described will effectively cushion road shocks and thereby eliminate the use of a pneumatic tire, consequently conserve rubber for the purpose of cushioning road shocks to a vehicle as the elastic sleeves 30 require much less rubber than the construction of a pneumatic tire.

The flanges 27 and 28 being of substantially hook shape in cross section will prevent the beads of the sleeves from pulling out of said flanges during the sliding movement of the sections 10 and 11 of the spokes.

The purpose of the key-hole shaped slots 18 is to permit the plates 14 to be assembled in annular formation and to provide the limited sliding movement between said plates during the cushioning action of the spokes when any one of said spokes are subjected to road shock.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a motor vehicle wheel, a main annular rim, means for mounting said rim on a hub, radially arranged spokes secured on said rim and each including telescopic sections, sleeves mounted in said sections, elastic means connecting said sleeves and coacting therewith in forming air chambers in the sections of the spokes, means for inflating the air chambers, channeled plates secured to said spokes, means for slidably connecting the channeled plates to permit the latter to coact with each other in forming a sectional annular tread carrying rim, and an annular rim including means for mounting an annular tread thereon carried by said sectional rim.

2. In a motor vehicle wheel, a main annular rim, means for mounting said rim on a hub, radially arranged spokes secured on said rim and each including telescopic sections and each section being of substantially rectangular shape in cross section, sleeves mounted in said sections and matching the shape thereof, elastic sleeves connecting the sleeves within said sections and coacting therewith in forming air chambers, inflating valves for said air chambers, plates secured to said spokes and including side flanges shorter in length than said plates to provide extensions on the ends of said plates, one of said extensions of each plate being offset from the plane of the plate and provided with slots, pins carried by the other extension of each plate to fit within the slots of adjacent plates, an annular rim mounted on said plates between the flanges thereof, and a noise deadening annular tread secured on the latter-named rim.

CHARLES H. WANN.